UNITED STATES PATENT OFFICE.

WALTER GLAESER, OF BROOKLYN, NEW YORK, ASSIGNOR, BY MESNE ASSIGNMENTS, TO POTASH EXTRACTION CORPORATION, OF NEW YORK, N. Y., A CORPORATION OF NEW YORK.

METHOD OF TREATING POTASSIUM-BEARING SILICATES.

1,285,122. Specification of Letters Patent. Patented Nov. 19, 1918.

No Drawing. Application filed March 8, 1915. Serial No. 12,925.

*To all whom it may concern:*

Be it known that I, WALTER GLAESER, a subject of the German Emperor, and a resident of Brooklyn, county of Kings, State of New York, have invented a new and useful Improvement in Methods of Treating Potassium-Bearing Silicates, (Case 5,) of which the following is a specification, the principle of the invention being herein explained and the best mode in which I have contemplated applying that principle, so as to distinguish it from other inventions.

The subject of the present invention is a method of treating feldspar to render the potassium contained therein available as a fertilizer, the process consisting, briefly stated, in the treatment of the potassium bearing silicates with phosphate rock which contains phosphate, which is valuable as a fertilizer, but which in its original state is completely insoluble in water and hence is not available. By my improved method of treating these two rocks, each is brought to give up its valuable material into a single product which is soluble in water and hence available for fertilizer. To the accomplishment of the foregoing and related ends, said invention, then, consists of the means hereinafter fully described and particularly pointed out in the claims.

The following description sets forth in detail one approved method of carrying out the invention, such disclosed mode, however, constituting but one of the various ways in which the principle of the invention may be used.

The potassium-bearing silicates are first heated at a temperature of about 800° C. for approximately two hours, and are then chilled suddenly, preferably by treatment in water, the resulting material being ground to the fineness of a 100-mesh screen.

The preliminary treatment of the silicate as described above is not in itself new and has been used before for the purpose of disintegrating the silicate and rendering it in a condition to be further crushed or treated. Obviously if the silicate undergoing treatment is already in a finely divided condition, or is in such a condition that it can be readily ground or crushed to a suitable fineness, then it will not be necessary to put the material through the preliminary treatment.

The phosphate rock which I use in connection with the potassium-bearing silicates is a mineral found in abundance in this country and hence relatively inexpensive and consisting chiefly of calcium phosphate. The phosphate rock, together with soda ash, is first heated to a bright red heat, the resulting products being sodium phosphate and carbonate of lime. The sodium phosphate is water soluble and hence can be readily removed from the mixture by leaching with water. The sodium phosphate can also be leached out with a solution of sodium phosphate which acts upon any insoluble potassium salts in the mass, rendering them water soluble and hence removable.

The finely powdered silicate is then mixed with the similarly powdered sodium phosphate in the proportion of substantially one hundred parts of the former to twenty-five parts of the latter. This mixture is then placed in a suitable furnace and heated for a considerable time to a temperature in excess of 1000° C. This treatment of the two substances results in the production of potassium phosphate and sodium silicate. The potassium phosphate is water soluble and may be readily removed from the resulting mass by leaching with water, or the entire mass may be used directly as a fertilizer if desired.

It is unnecessary to prepare the sodium phosphate beforehand, and the same result can be secured if the phosphate rock, together with the necessary amount of soda ash, be mixed directly with the potassium-bearing silicate after the preliminary treatment of the same. The product of my present improved method is a valuable and powerful fertilizing agent, which is made particularly valuable for this purpose by the combination of the potassium and phosphate although secured without much increase in the cost of the original materials.

It will be evident that for the purpose of the present invention, it is immaterial whether the phosphate rock be prepared for use with potassium-bearing silicates by my specified process, or by some other process, and the method of so preparing the phosphate rock which I have here disclosed, is in itself an invention which will be made the subject of a separate application.

Other modes of applying the principle of my invention may be employed instead of the one explained, change being made as regards the process herein disclosed or the materials employed in carrying out the process, provided the step or steps stated by any of the following claims or the equivalent of such stated step or steps be employed.

I therefore particularly point out and distinctly claim as my invention:—

1. In a method of treating potassium bearing silicates, the steps which consist in heating the silicate, suddenly cooling the same, grinding the resulting material to pass a 100 mesh screen, mixing such material with finely ground sodium phosphate, and then heating such mixture to a temperature above 1000° C.

2. In a method of treating potassium bearing silicates, the steps which consist in heating the silicate, suddenly cooling the same, grinding the resulting material, mixing such material with sodium phosphate in the proportions of 100 parts of silicate to 25 parts of phosphate, and then heating such mixture to a temperature above 1000° C.

3. In a method of treating potassium bearing silicates, the steps which consist in heating the silicate, suddenly cooling the same, grinding the resulting material to pass a 100 mesh screen, mixing such material with sodium phosphate in the proportions of 100 to 25, and then heating such mixture to a temperature above 1000° C.

4. In a method of treating potassium-bearing silicates, the step which consists in heating finely divided silicate with sodium phosphate to a temperature above 1000 degrees C.

Signed by me, this 16th day of February, 1915.

WALTER GLAESER.

Attested by—
J. J. DOYLE,
E. A. GANNON.